(12) United States Patent
Nakano et al.

(10) Patent No.: US 7,057,692 B2
(45) Date of Patent: Jun. 6, 2006

(54) APPARATUS AND METHOD FOR FORMING ALIGNMENT LAYER WITH MASK HAVING A CURVED OR WARPED SURFACE

(75) Inventors: Hiroki Nakano, Shiga (JP); Nobuo Okazaki, Moriyama (JP); Yukito Saitoh, Sagamihara (JP); Shuhichi Odahara, Atsugi (JP)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 10/604,553

(22) Filed: Jul. 30, 2003

(65) Prior Publication Data

US 2004/0246419 A1  Dec. 9, 2004

(30) Foreign Application Priority Data

Jul. 31, 2002  (JP) .............................. 2002-224054

(51) Int. Cl.
*G02F 1/1337* (2006.01)
(52) U.S. Cl. ...................... 349/124; 430/321; 430/325; 250/492.3
(58) Field of Classification Search ................ 349/123, 349/124, 129; 430/320, 321; 250/492.3
See application file for complete search history.

(56) References Cited

U.S. PATENT DOCUMENTS

| 5,486,403 | A | 1/1996 | Ishitaka et al. |
| 5,770,826 | A | 6/1998 | Chaudhari et al. |
| 6,061,114 | A | 5/2000 | Callegari et al. |
| 6,061,115 | A | 5/2000 | Samant et al. |
| 6,124,914 | A | 9/2000 | Chaudhari et al. |
| 6,313,896 | B1 | 11/2001 | Samant et al. |
| 6,331,381 | B1 * | 12/2001 | Chaudhari et al. ........... 430/320 |
| 6,377,326 | B1 * | 4/2002 | Kuo et al. ................... 349/129 |
| 6,479,218 | B1 * | 11/2002 | Choi ........................... 430/321 |
| 2002/0001057 | A1 | 1/2002 | Chaudhari et al. ........... 349/124 |

FOREIGN PATENT DOCUMENTS

| JP | 07-056172 | 3/1995 |
| JP | 7-056172 | 3/1995 |
| JP | 9-244027 | 9/1997 |
| JP | 10-253962 | 9/1998 |
| JP | 11-160711 | 6/1999 |

\* cited by examiner

*Primary Examiner*—Andrew Schechter
*Assistant Examiner*—Michael H. Caley
(74) *Attorney, Agent, or Firm*—Ohlandt, Greeley, Ruggiero & Perle, L.L.P.; Joseph P. Abate, Esq.

(57) ABSTRACT

It is an object of the present invention to provide an apparatus and a method for forming an alignment layer to align the orientation direction of liquid crystals. In an apparatus 10 for forming an alignment layer according to the present invention, the shape of an edge 32a of a mask 12 for forming a slit 14 is determined by integrating the orientation direction of liquid crystals. The liquid crystals can be uniformly oriented by the edge 32a having such shape. This leads to the manufacturing of a liquid crystal display free from irregularity in brightness and color.

9 Claims, 10 Drawing Sheets

PRIOR ART

PRIOR ART

APPARATUS AND METHOD FOR FORMING ALIGNMENT LAYER WITH MASK HAVING A CURVED OR WARPED SURFACE

BACKGROUND OF INVENTION

The present invention relates to an apparatus and a method for forming a liquid crystal alignment layer with ion beam irradiation.

In a liquid crystal display (LCD), the orientation direction of liquid crystals is controlled by an alignment layer formed on a substrate. A beam of ions is irradiated at a thin film made of polyimide or an inorganic material. A bond between atoms of the thin film is broken to form an alignment layer with ion beam irradiation. Conventionally, as shown in FIGS. 12 (a) and 12 (b), an ion beam 16 is irradiated at a thin film 30 while moving a substrate 28. As will be mentioned later, the ion beam 16 has divergence and masks 12 are designed in such a manner that only the ion beam 16 is irradiated at the thin film 30 through a slit 14 to contribute to the formation of an alignment layer.

The orientation direction of liquid crystals is determined by an angle φ shown in FIG. 13, in other words, an angle between the ion beam 16 projected on X-Y plane (a plane parallel to the substrate 28 and the masks 12) shown in FIG. 12 (b) and Y-axis, and density distribution of the ion beams 16. Moreover, Y-axis is assumed to be an edge 32a of the mask 12 in FIG. 14. The orientation direction is assumed to be an angle between a major axis of liquid-crystal molecules and Y-axis or X-axis when projecting the molecules on the substrate. An angle θ is an incident angle relative to an X-Y plane in FIG. 13.

Actually, ion beams 16 generated from an ion source have divergence. More particularly, the ion source has a number of outlets to emit the ion beams 16 and a plurality of ion beams 16 emitted from the outlets are irradiated in different directions respectively. The ion beams 16 are irradiated at a point on the thin film 30 from a plurality of directions. The ion beams 16 which affect the orientation direction are the strongest in this respect. It is necessary to align the orientation of the ion beams 16 in all points of the thin film 30.

If the above angle φ is different depending on the position of the alignment layer, liquid crystals will not be aligned in a unidirectional manner. This causes irregularity in brightness and color of the liquid crystal display. As shown in FIG. 14, when the ion beams 16a, 16b, and 16c respectively have different angles φ at each of points A, B, and C on the thin film 30, the orientation direction of the liquid crystals becomes non-uniform. Uniformity in orientation direction of the liquid crystals is required to produce liquid crystal displays of high picture quality.

SUMMARY OF INVENTION

It is an object of the present invention to provide an apparatus and a method for forming an alignment layer to align the orientation direction of liquid crystals.

An apparatus for forming an alignment layer according to the present invention comprises: means for generating an ion beam or an atomic beam to form an alignment layer on a substrate of a liquid crystal display; masks interposed between the substrate and the generating means; and a slit formed by a plurality of edges of masks, in which one of the edges includes the shape corrected based on the orientation direction of liquid crystals. Not all ion beams or atomic beams irradiated from the above-mentioned generating means are aligned in a unidirectional manner. The edges of the masks to form a slit have the corrected shape based on the orientation direction of the liquid crystals. The apparatus for forming an alignment layer using one of the edges forms an alignment layer having uniform orientation direction of liquid crystals. More particularly, one of the edges of the mask is in a shape obtained by integrating the distribution of the orientation direction of the liquid crystals.

In another apparatus for forming an alignment layer, the shape of one of edges may be deformed by correcting the shape of the edge projected on a substrate based on the orientation direction of liquid crystals. When the shape of the edge projected is a curve, masks are wavy in a direction perpendicular to the substrate, so that the distance between the edges and the substrate becomes different at each position of the edges.

A method for forming an alignment layer according to the present invention comprises the steps of: generating an ion beam; forming an alignment layer by irradiating an ion beam at a thin film on a substrate via a slit formed by edges of masks; and correcting the orientation direction of liquid crystals according to the alignment layer formed on the substrate using one of the edges.

BRIEF DESCRIPTION OF DRAWINGS

FIG. 1 (a) is a side view and FIG. 1 (b) is a top view.

FIG. 10 (a) is a cross-section of an edge warped in top and down directions against the substrate. FIG. 10 (b) is a top view of an edge projected on the substrate or the thin film.

FIG. 11 (a) shows a slit with one side deformed. FIG. 11 (b) shows a silt with both sides deformed.

FIG. 12 (a) is a side view and FIG. 12 (b) is a top view.

DETAILED DESCRIPTION

Now, a preferred embodiment of a method and an apparatus for forming an alignment layer according to the present invention will be described in detail on the basis of accompanying drawings.

Figure 1:
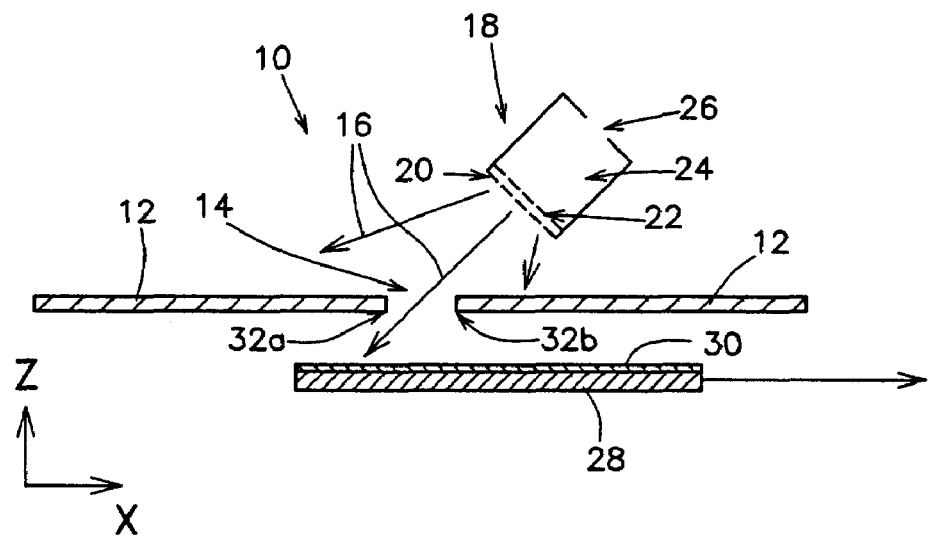
FIGS. 1 (a) and 1 (b) respectively show an apparatus for forming an alignment layer according the present invention.
Figure 1:
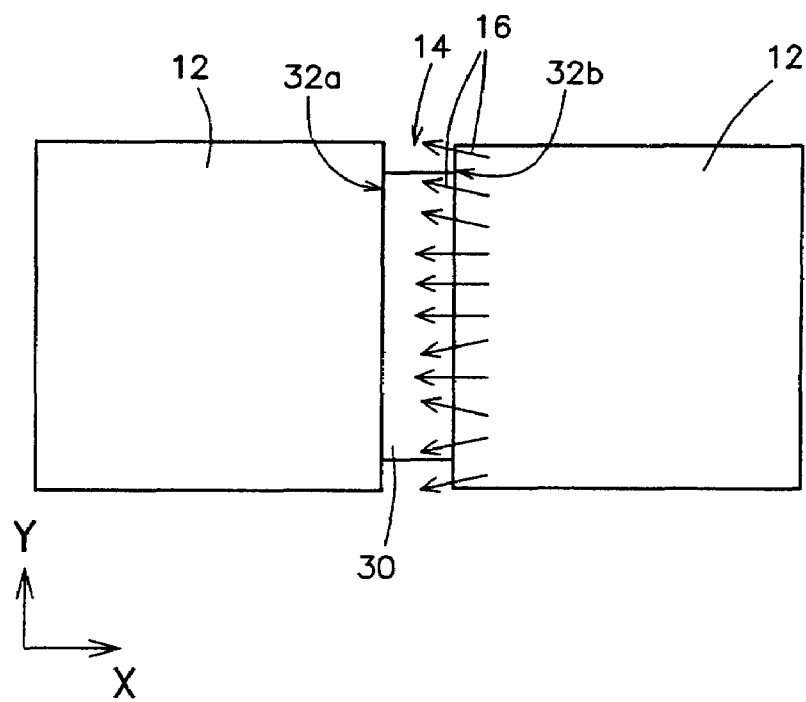

As shown in FIGS. 1 (a) and 1 (b), an apparatus 10 for forming an alignment layer comprises an ion source 18 for generating ion beams 16 and a plurality of masks 12 interposed between a substrate 28 and the ion source 18. Two pieces of masks 12 are disposed on a plane parallel to the substrate 28 and a slit 14 is created by edges 32a and 32b of the masks 12. The apparatus 10 includes a stage (not shown in the figures) for placing the substrate 28 and moving it in the direction with arrow shown in the figures. The ion source 18 is omitted in FIG. 1 (b).

The ion source 18 comprises: a plasma generating chamber 24; an inlet of gas 26 for feeding gas into the plasma generating chamber 24; an accelerating electrode 22 for accelerating ions generated in the plasma generating chamber 24; and a grid 20 including an exhaust of ions for discharging accelerated ions outside. The grid 20 is, for example, in a rectangle shape, where a plurality of ion exhausts are uniformly aligned. For example, Argon (Ar) gas is used as gas. When Argon gas is used, Argon ion (Ar+) is generated in the plasma generating chamber 24.

Figure 2:
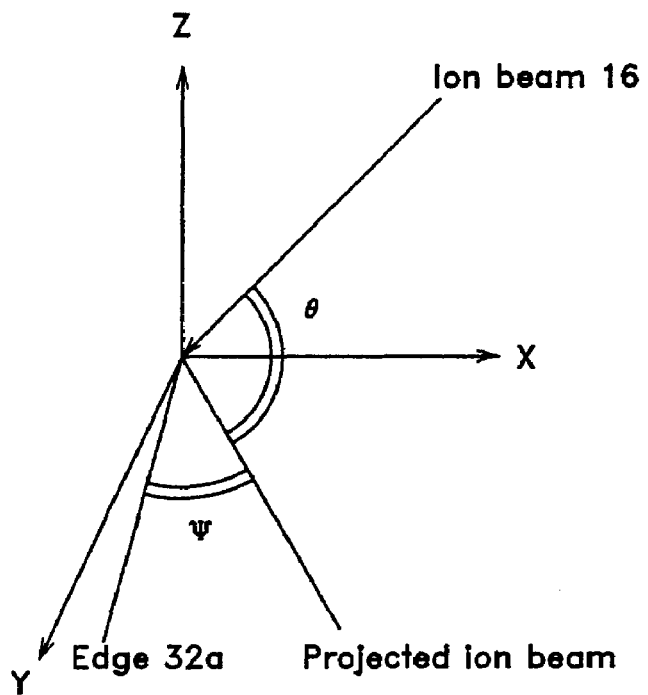
FIG. 2 shows a relationship between each plane and each ion beam shown in FIG. 1

An explanation will now be given to the shape of edges on the masks 12. In FIG. 2, an angle $\psi$ is assumed to be an angle between an ion beam 16 projected on an X-Y plane (a plane parallel to the substrate 28 and the masks 12) shown in FIG. 1 and the edge 32a. The angle $\psi$ is 90 degrees when an ion beam to be projected overlays on X-axis and the edge 32a overlays on Y-axis.

Figure 3:
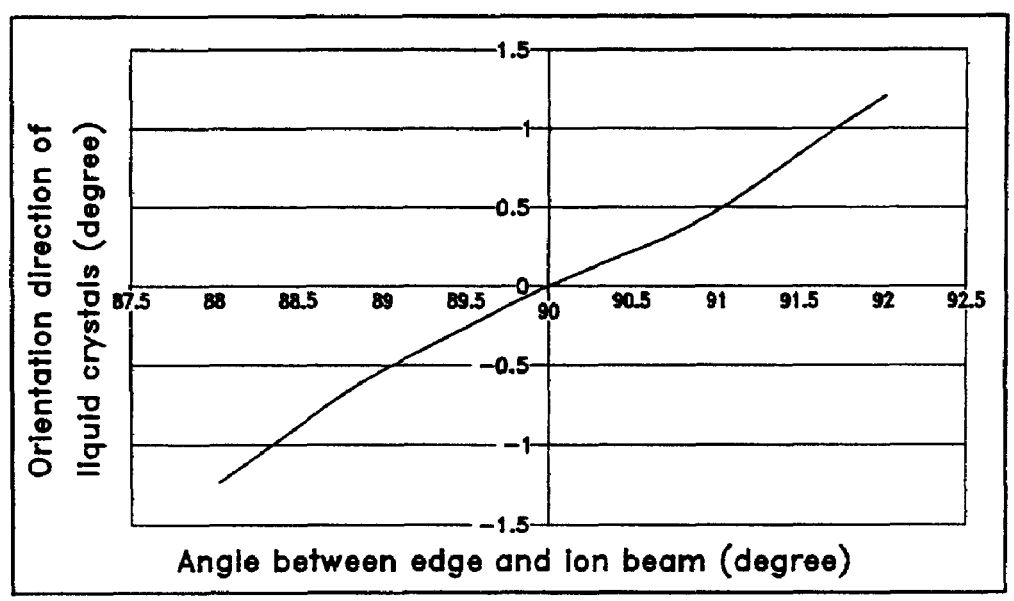
FIG. 3 shows a relationship between an edge and an orientation direction according to an angle of an ion beam.

FIG. 3 shows a relationship between an angle $\psi$ between an edge 32a and an ion beam 16, and the orientation direction of liquid crystals. In FIG. 3, the strength of the ion beam 16 irradiated from an ion source 18 is uniformed in a lengthwise direction (Y-direction) of the ion source 18. The irradiation direction of the ion beam 16 is parallel to the traveling direction of the substrate 28.

Figure 4:
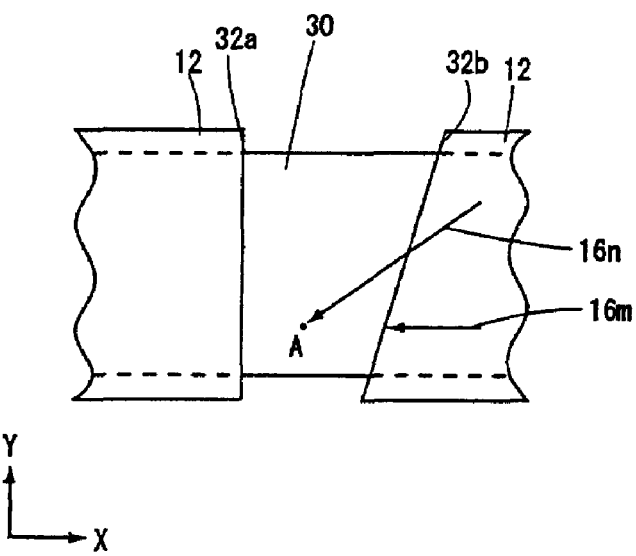
FIG. 4 shows that ion beams have reached a thin film when an edge is tilted.

In FIG. 3, when the angle $\psi$ between the ion beam 16 and the edge 32a is 90 degrees, the orientation direction of liquid crystals is 0 degree, in other words, the orientation direction corresponds with the irradiation direction of the ion beam 16. Unless the angle $\psi$ is 90 degrees, the orientation direction is off the irradiation direction of the ion beam 16. This reason will now be explained. As shown in FIG. 4, assuming that the edge 32b has a tilt relative to Y-axis, an ion beam 16m in the above-mentioned irradiation direction does not reach Point A due to the masks 12, although Point A on a thin film 30 disposed on the substrate 28 moves. On the contrary, an ion beam 16n irradiated from a slanting direction reaches Point A, which finally leads to be irradiated. Accordingly, the orientation direction is determined by the ion beam 16n and the orientation direction of the liquid crystals is misaligned.

Figure 5:
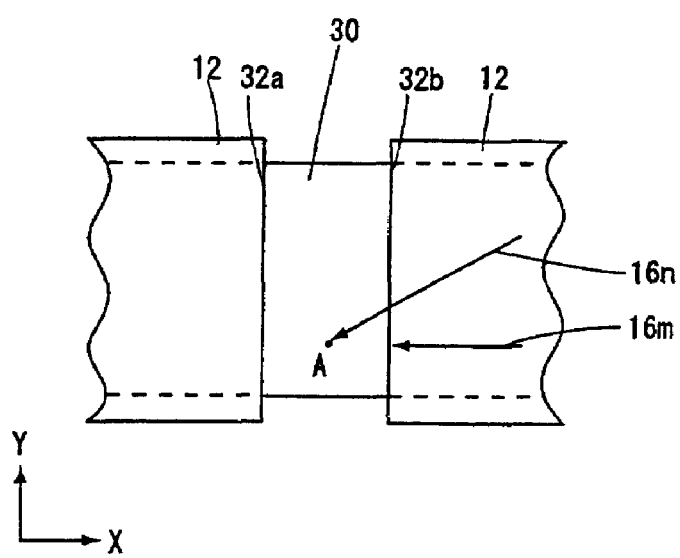
FIG. 5 shows that ion beams have reached a point on a thin film from multi-directions.

As shown in FIG. 5, when the ion beam 16n irradiated from a slightly slanting direction is stronger than the ion beam 16m, the orientation direction is determined by the ion beam 16n and the orientation direction is misaligned, even if the angle $\psi$ between the ion beam 16m and the edge 32b is 90 degrees.

As mentioned above, drawbacks indicated in FIG. 5 are overcome by determining the shape of the edge 32b utilizing the nature of FIGS. 3 and 4, which results in a uniform orientation direction of liquid crystals.

As shown in FIG. 3, when the angle $\psi$ between the edge 32b and the ion beam 16 is close to 90 degrees, there is a linear relationship between the orientation direction of the liquid crystals and the angle $\psi$. The shape of the edge 32b is determined employing this relationship to correct the orientation direction of the liquid crystals in the present invention.

For example, it is assumed that the distribution of the orientation direction of liquid crystals represents function T (x) at each position of an alignment layer in the direction perpendicular (Y-direction) to the direction of movement. To correct the orientation direction using the edge 32b, assuming that the shape distribution of the orientation direction of the liquid crystals is function f (x), the following equation can be obtained:

$$-\frac{\partial f(x)}{\partial x} = aT(x)$$

Figure 6:
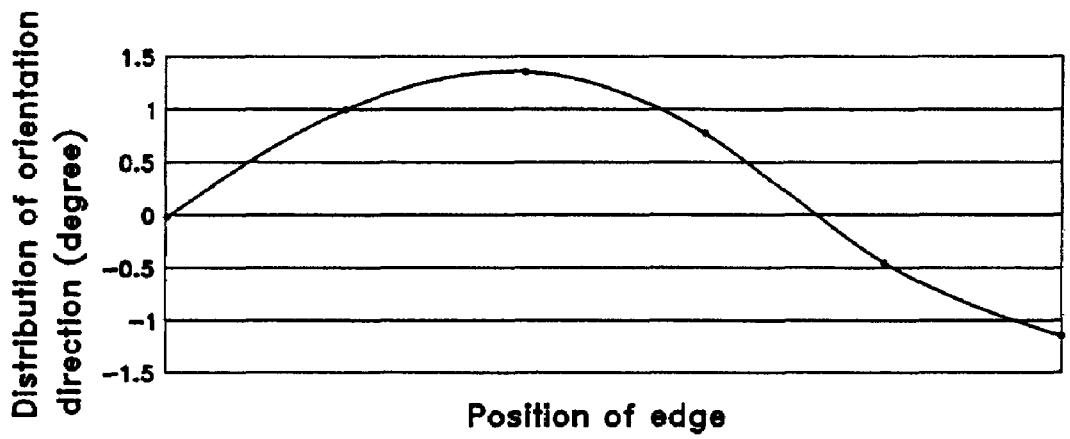
FIG. 6 shows the distribution of the orientation direction.
Figure 7:
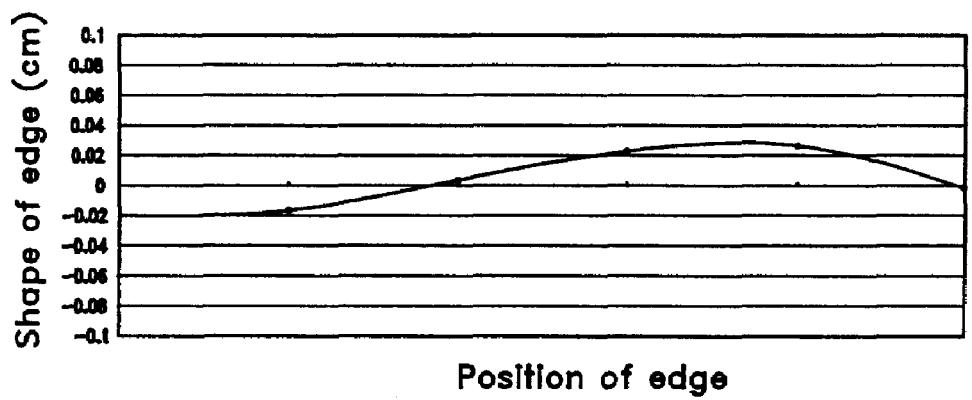
FIG. 7 shows the shape of the edge to correct the orientation direction shown in FIG. 6.

In Equation 1, "a" is a constant and fluctuates according to the size of the substrate, the kind of alignment layer and liquid crystals, and the nature of the beams. The constant "a" can be obtained by an experiment, and one of its examples is 0.5. Function T (x) represents the orientation direction of liquid crystals as shown in FIG. 6, and function f (x) represents the shape of the edge 32b as shown in FIG. 7. Assuming that the shape of the edge 32b is perpendicular and linear relative to the moving direction of the substrate 28 and the ion beam 16 is irradiated at the thin film 30 using the edge 32b, the orientation direction would be the distribution as indicated in FIG. 6. When f (x) is obtained using the Equation 1 to correct the distribution of the orientation direction to be linear, f (x) is indicated as shown in FIG. 7. It is possible to align the orientation of liquid crystals by making the edge 32b to be in a shape like FIG. 7. The distribution of orientation direction of the liquid crystals shown in FIG. 6 is one example. Actually, the distribution may be changed according to the characteristics of the ion source 18. It is important to form the shape of the edge 32b of the mask 12 to provide a uniform orientation direction of liquid crystals, whatever measured distribution of the orientation direction may be.

To summarize, the edge 32b is determined based on the distribution of the orientation direction of liquid crystals in an alignment layer formed by a linear edge perpendicular to the moving direction of the substrate 28. As shown in the Equation 1, the shape is determined by integrating function T (x) showing the distribution of the orientation direction along the above-mentioned linear edge.

Figure 8:
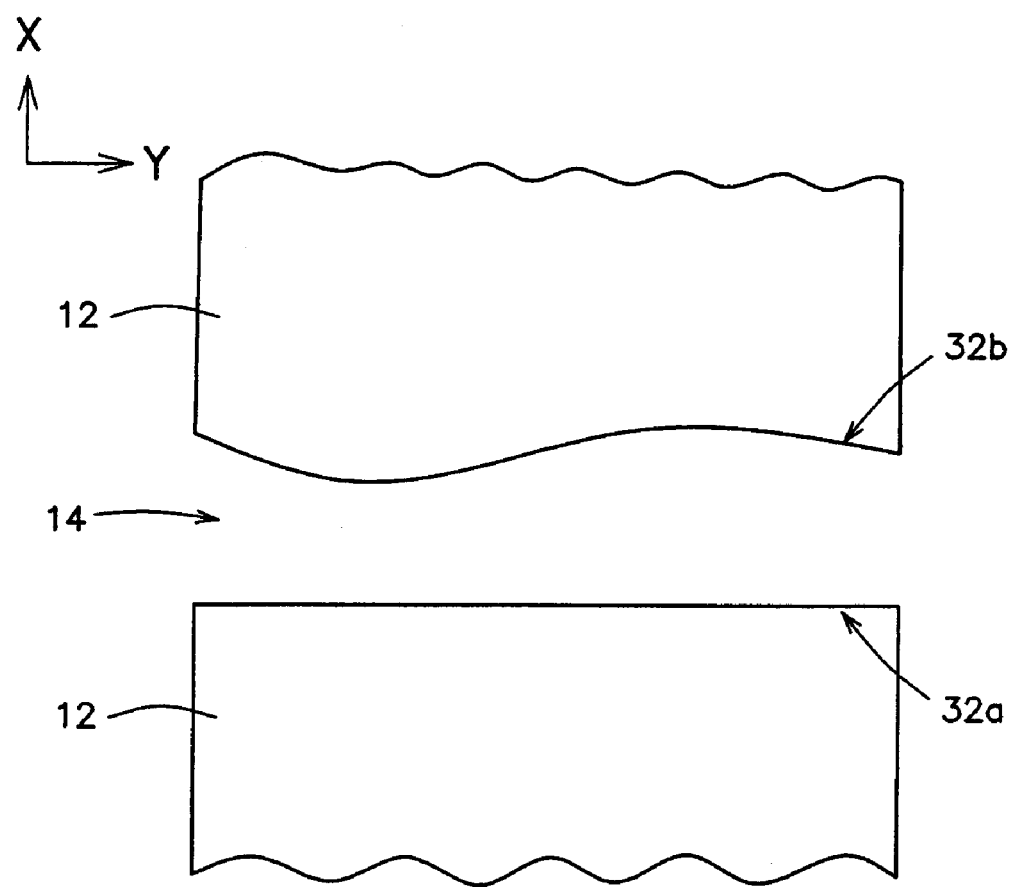
FIG. 8 is a top view for showing the shape of edges for forming a slit.

For example, the slit 14 using the edge 32b determined by the Equation 1 shown in FIG. 7 is like FIG. 8. The edge 32b is on the end side of the moving direction of the substrate 28. The edge 32a provided on the starting side is in a linear shape. The reason why the edge 32b provided on the end side includes a shape determined based on the orientation direction of the liquid crystals is that the finally exposed ion beams 16 have an effect on the orientation direction. Although the edge 32b provided on the end side includes a curved shape, the edge 32b may be in a shape including a linear shape depending on the results of the Equation 1.

Even if there is no linear relationship between the orientation direction of the liquid crystals and the shape of the edge 32b, it is possible to correct the orientation direction. It is assumed that a distribution of the shape of the edge 32b is f (x), and a distribution of the orientation direction to be corrected is T (x). Assuming that the relationship between an angle $\psi$ between the edge 32b and an ion beam 16, and the orientation direction is experimentally determined to find the angle $\psi$ is a function in the orientation direction T, f (x) is expressed by the following equation, putting the function as g (T):

$$-\frac{\partial f(x)}{\partial x} = g(T(x))$$

Variations in orientation direction can be aligned in one direction by determining the shape of the edge 32b based on this relationship.

An alignment layer is formed using an apparatus 10 for forming an alignment layer. The substrate 28 is placed on a stage to move the substrate 28. Ion beams 16 which have passed through the slit 14 are irradiated at the thin film 30 during movement. The orientation direction is controlled by the shape of the edge 32b. As mentioned above, it is possible to produce liquid crystal displays free from irregularity in brightness and color because of uniformed orientation direction.

Figure 9:
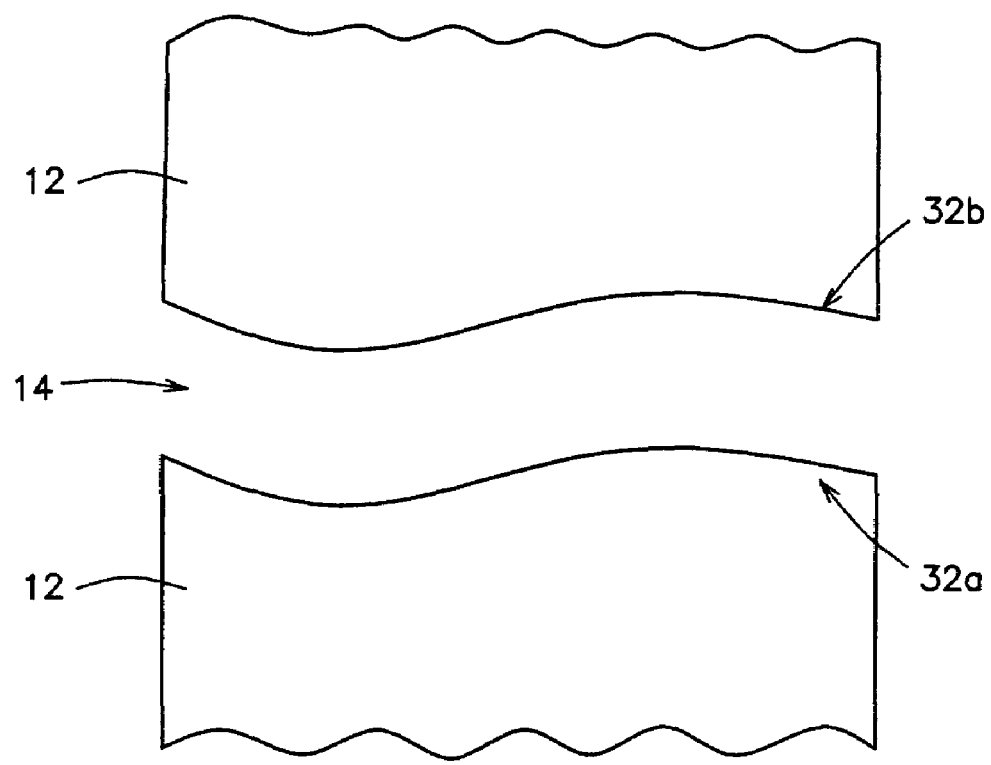
FIG. 9 shows a slit in the case that both edges are in the same shape.

The edge 32b provided on the end side is deformed by the Equations 1 and 2 to control the orientation direction of liquid crystals, but as shown in FIG. 9, the edge 32a provided on the starting side may be deformed in the same manner as the edge 32b provided on the end side. Force of liquid crystals being autonomously aligned in a unidirectional manner without electric field, that is, orientation force of liquid crystals is a total volume of function of the ion beams 16 which the thin film 30 has been exposed to. The total volume of the ion beams 16 is determined by the duration in which the thin film 30 is exposed to the ion beams 16 when the strength of the ion beams 16 is constant. To make orientation force also uniform, the total volume of the ion beams 16 which the thin film 30 is exposed to is constant by making the edges 32a and 32b respectively provided on the starting and end sides in the same shape.

Figure 10:
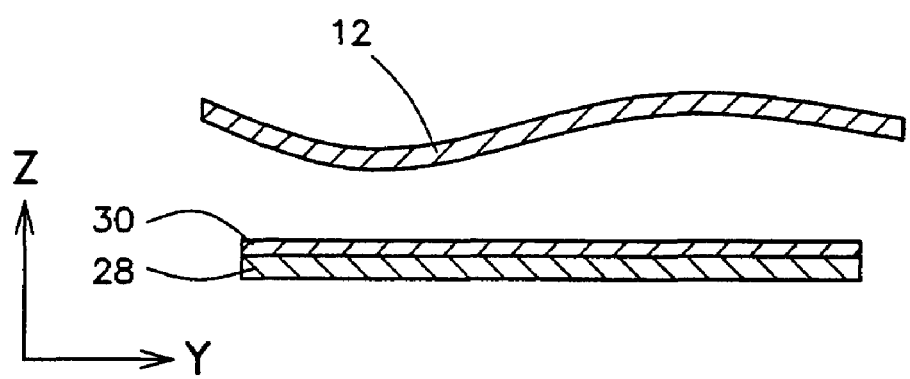
FIGS. 10 (a) and 10 (b) respectively show an apparatus for forming an alignment layer with their edges warped.
Figure 10:
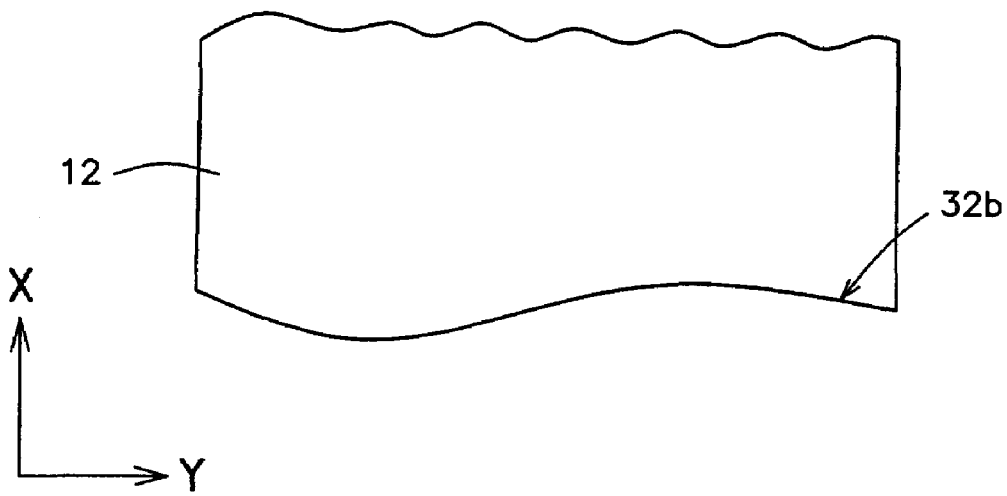

The edge 32b of the mask 12 may be deformed using another method. For example, in the above-mentioned embodiment, the X-Y plane, that is, mask 12 has been deformed on a plane parallel to the substrate 28, but the mask 12 is deformed in a direction perpendicular (Z direction) to the plane in this embodiment. As shown in FIG. 10 (a), a wavy mask 12 with warp and the wavy edge 32b are used. More specifically, the distance between the substrate 28 and the edge 32b in Z direction varies according to the position of the edge 32b. As shown in FIG. 10 (b), if the edge 32b is projected on the substrate 28 or the thin film 30, the edge 32b will be in a curve shape. In other words, looking at the ion source 18 from the substrate 28, the edge 32b of the slit 14 is a curve. The shape of this curve obtained by the Equations 1 and 2, that is, the shape of this curve is determined based on the orientation direction of the liquid crystals in the same manner as the previous embodiment. In FIG. 10, the shape of the edge 32b projected on the substrate 28 is a curve, but it is in a shape including a straight line depending on the results of the Equations 1 and 2.

Further, the edge 32a positioned on the starting side becomes in a linear shape by deforming the edge 32b positioned on the end side of the moving direction of the substrate 28. Alternatively, the edges 32a and 32b respectively provided on the starting and the end sides are allowed to be in the same shape.

The edge 32b can be deformed by externally exerted forces on the mask 12. It is, therefore, possible to dynamically deform the edge 32b.

It is possible to control the orientation direction of liquid crystals using the edge 32b to obtain uniform alignment of the liquid crystals, regardless of the structure which has been described so far. Accordingly, it is possible to manufacture liquid crystal displays free from irregularity in brightness and color.

Figure 11:
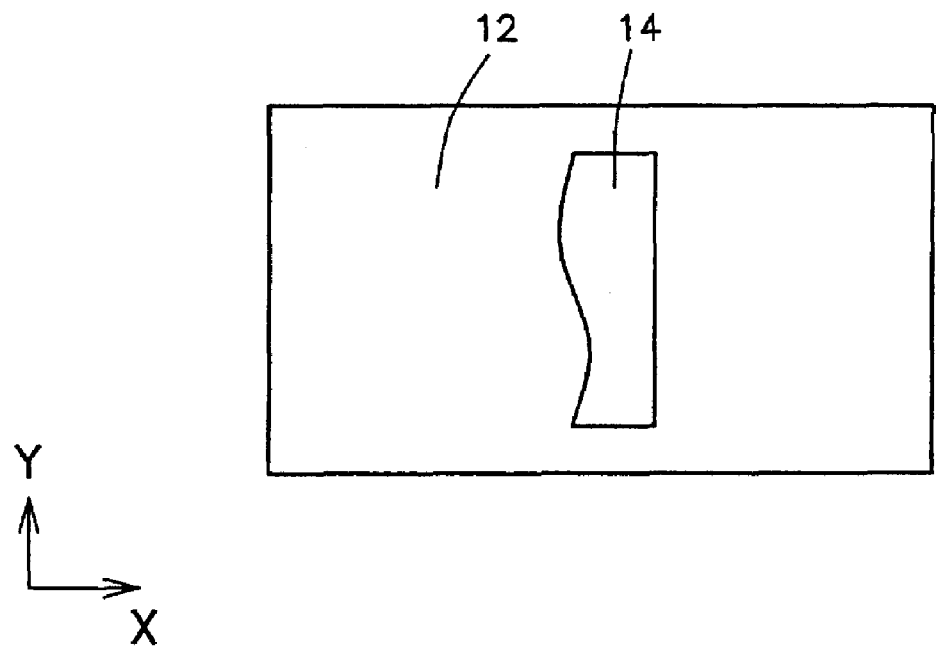
FIGS. 11 (a) and 11 (b) respectively show the formation of a slit using one piece of mask.
Figure 11:
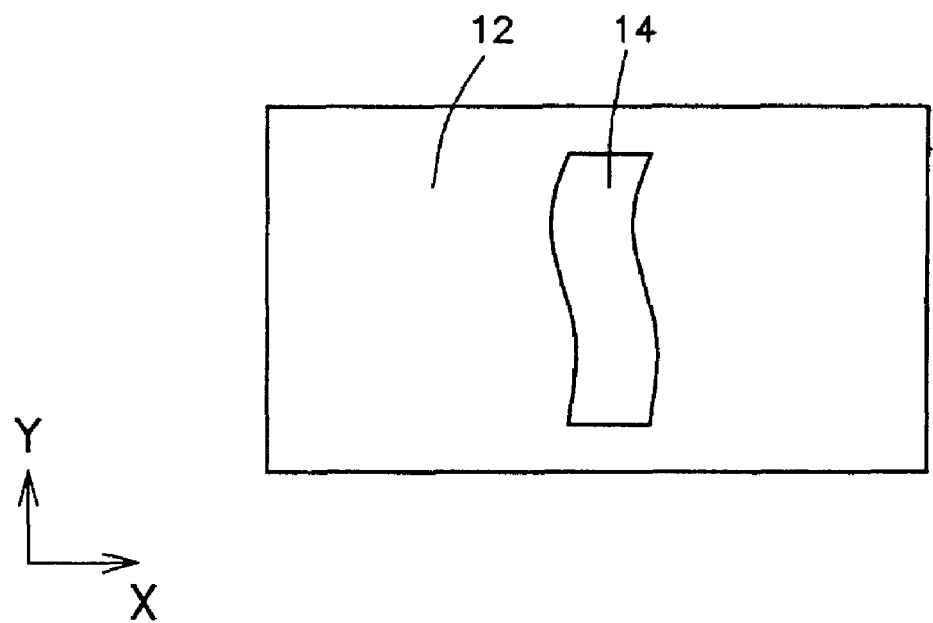
Figure 12:
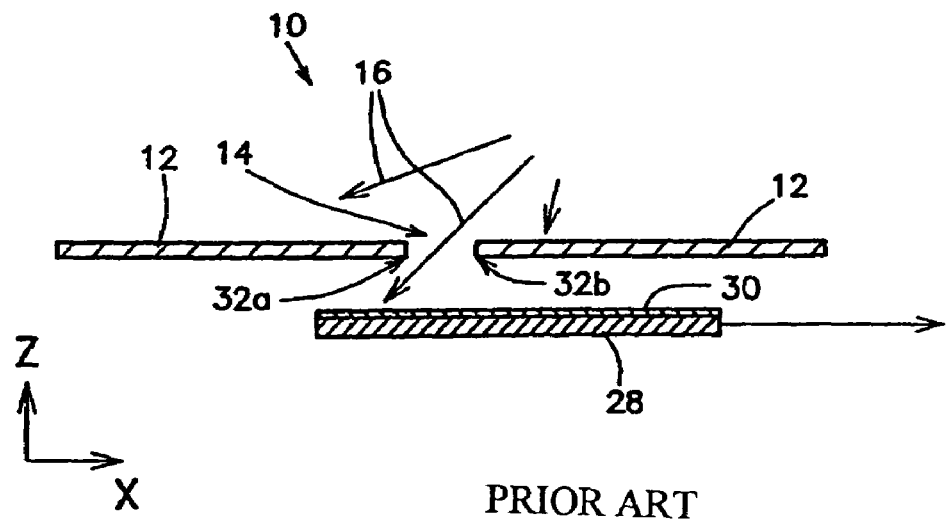
FIGS. 12 (a) and 12 (b) respectively show the formation of a conventional alignment layer.
Figure 12:
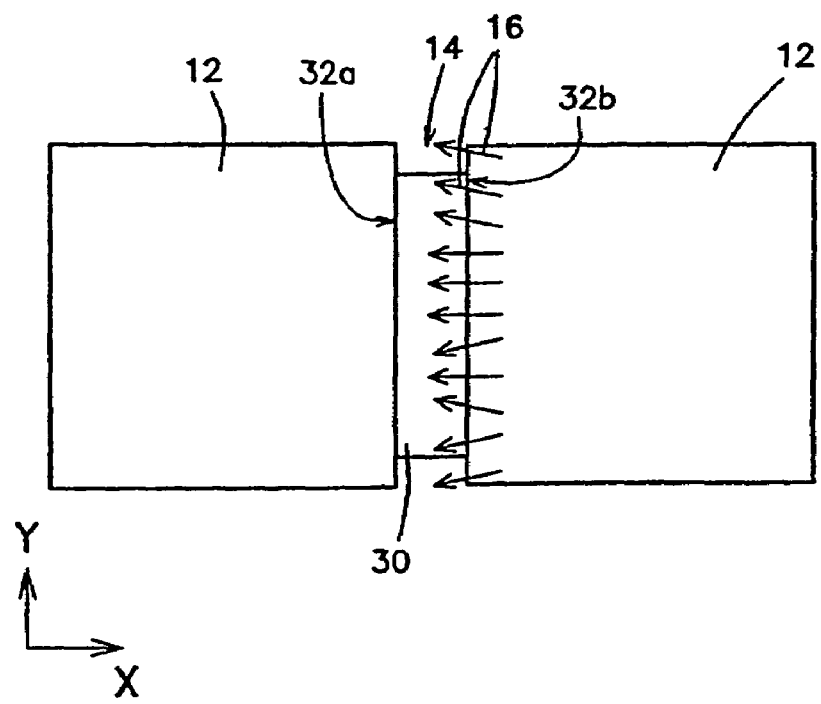
Figure 13:
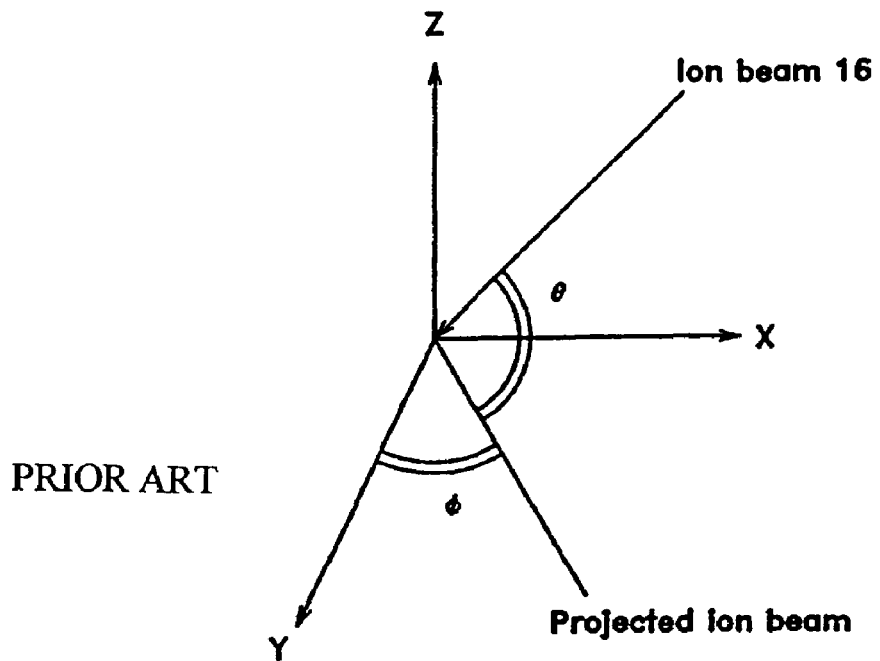
FIG. 13 shows a relationship between each plane and each ion beam shown in FIGS. 12 (a) and 12 (b).
Figure 14:
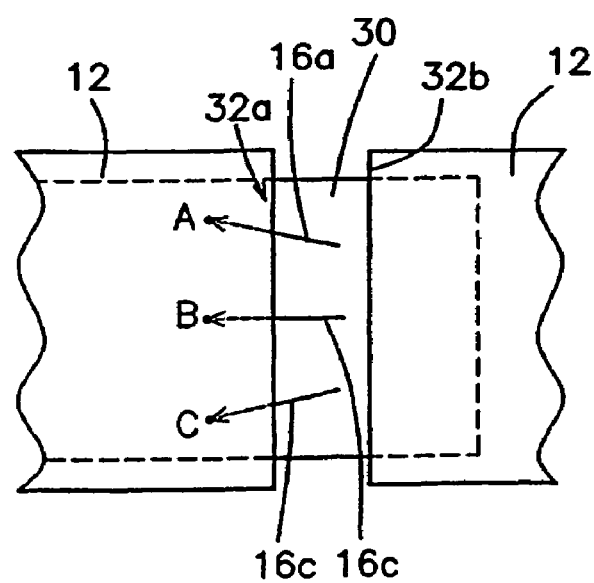
FIG. 14 is a top view for showing an angle ψ of ion beams at each point of a thin film.

As shown in FIGS. 11 (a) and 11 (b), a slit 14 may be formed using one piece of mask 12 as well as using two pieces of the masks 12.

Additionally, the structure for irradiating a beam of atoms by neutralizing ion beams 16 generated by the ion source 18 may be employed as well as the irradiation of the ion beams 16.

The preferred embodiments of the present invention have been described so far, but the present invention is not limited to these embodiments. Also, any and all modifications, variations or equivalent arrangements which may occur to those skilled in the art should be considered to be within the scope of the invention.

According to the present invention, an uniform alignment layer can be formed by controlling an angle between an edge and an ion beam. Accordingly, the present invention enables the manufacturing of liquid crystal displays free from irregularity in brightness and color.

10: Apparatus for forming an alignment layer
12: Mask
14: Slit 16, 16a, 16b, 16c, 16m, 16n: Ion beam
18: Ion source
20: Grid
22: Accelerating electrode
24: Plasma generating chamber
26: Inlet of gas
28: Substrate
30: Thin film
32a, 32b:

The invention claimed is:

1. An apparatus for forming an alignment layer on a substrate of a liquid crystal display, comprising:
    an irradiation source; and
    a mask between the substrate and the irradiation source, said mask being curved in a plane perpendicular to the substrate.

2. The apparatus according to claim 1, further comprising an external force exerted on said mask for deforming the mask.

3. The apparatus according to claim 1, wherein said mask is dynamically deformable.

4. The apparatus according to claim 1, wherein said mask comprises an edge that is deformed in a plane parallel to the substrate.

5. The apparatus according to claim 4, further comprising an external force exerted on said mask for deforming the mask.

6. The apparatus according to claim 4, wherein said mask is dynamically deformable.

7. An apparatus for forming an alignment layer on a substrate of a liquid crystal display, comprising:
    an irradiation source; and
    a mask between the substrate and the irradiation source, said mask having an edge that is warped in a plane perpendicular to the substrate.

8. The apparatus according to claim 7, further comprising means for exerting an external force on said edge, said external force being sufficient to warp said edge.

9. The apparatus according to claim 7, wherein said edge is deformed in a plane parallel to the substrate.

* * * * *